Dec. 1, 1953 S. SHALER 2,660,785
WOOD SCRAPER
Filed Feb. 17, 1949
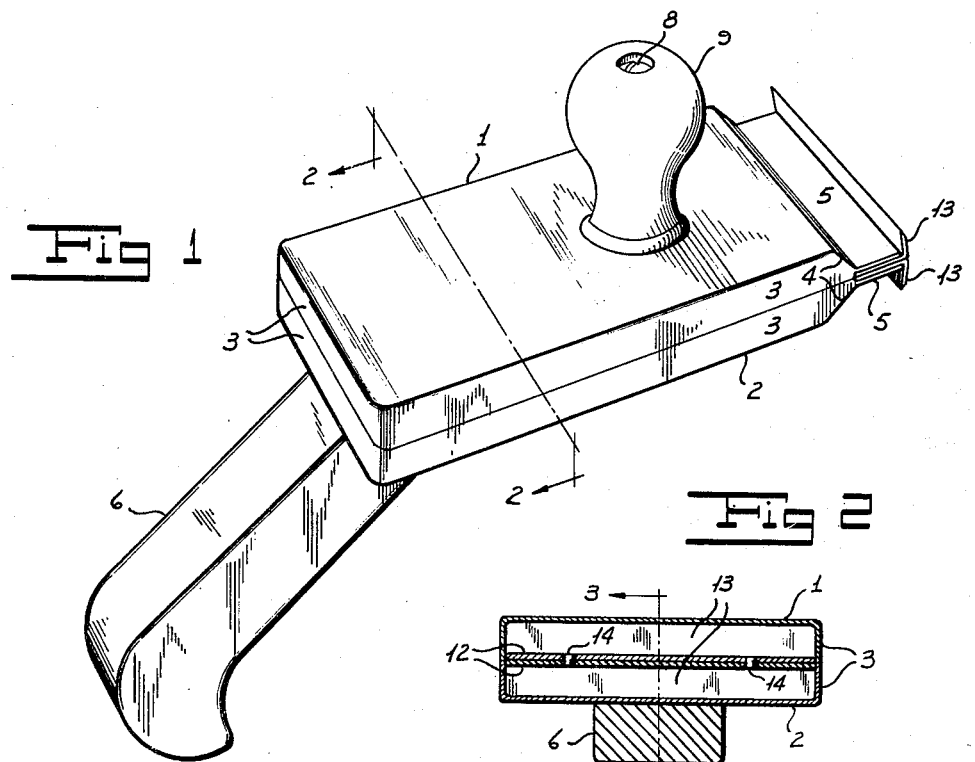
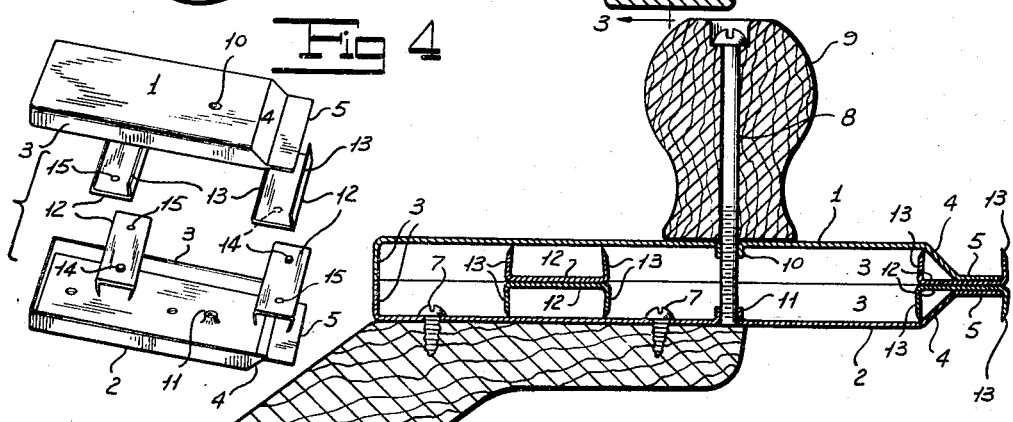
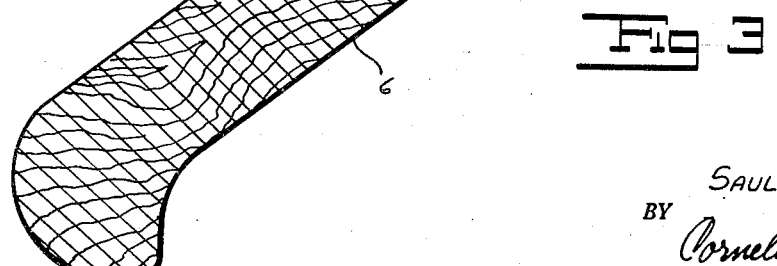
INVENTOR.
SAUL SHALER
BY Cornelius Zabriskie
ATTORNEY Patented Dec. 1, 1953

2,660,785

UNITED STATES PATENT OFFICE 2,660,785

WOOD SCRAPER

Saul Shaler, Jackson Heights, N. Y.

Application February 17, 1949, Serial No. 76,988

4 Claims. (Cl. 30—172)

This invention is a scraper for use by woodworkers and painters for scraping floors, woodwork, furniture, boats, etc. It relates more particularly to that general type of scraper which utilizes a duplex cutter, i. e., a cutter wherein two channeled cutting elements are mounted in the scraper in back to back relation, so that the cutter, as a whole, is of substantially I-beam cross section with the free edges of all four flanges sharpened to cutting edges. The duplex cutter of this invention is formed from two channeled sections preferably detachably pinned to one another, although they may be permanently secured together if desired.

The present invention is directed especially to the scraper body. Heretofore scraper bodies have generally been made in the form of a wood block laterally slotted across one end and the cutter is adapted to be forced into the slot to mount it on the body. With this type of scraper, the changing of cutters is attended by very considerable hazard and serious injury frequently results to the hands of the operator in withdrawing a dulled cutter and inserting a sharp one. Scrapers with metallic bodies have been placed on the market, but they involve the use of complicated and expensive dies and have not generally met with favor. The scraper of this invention is so constituted as to eliminate the difficulties and hazards of prior tools of this kind.

The object of the present invention is to provide a scraper wherein the parts may be economically made by quantity production methods and readily assembled in a simple and expeditious manner to provide a tool of high efficiency.

Speaking generally, the scraper of this invention is formed from two identical sections which may be readily stamped or drawn from sheet metal of requisite strength and thickness to form the complementary sections. Each section comprises a flat plate of substantially rectangular form provided along its longitudinal edges and across one end with a skirt or wall of uniform depth. The opposite end of each section has an inclined wall merging into a clamping jaw. The two sections are adapted to be assembled with their peripheral walls in edge to edge abutting relation to form a hollow body closed on three sides and provided at its forward end with substantially parallel clamping jaws between which the web of a duplex cutter may be gripped with two of the cutting edges exposed for use and the other two cutting edges within the housing. The housing has an internal width substantially equal to the length of the duplex cutter and the jaws and inclined portion of the housing are collectively of a depth substantially equal to the depth of the web of the cutter. Thus, when a cutter is clamped between the jaws, by means of a tie bolt passing through the plates of the two sections, such cutter not only serves to aline and register the forward ends of the sections, but it also locks these sections against relative longitudinal movement. When a similar duplex cutter, to be stored as a spare, is positioned interiorly of and transversely of the housing, this latter cutter serves to aline and register the edge abutting walls of the two sections at the rear portion of the body, so that, as long as the sections are held together by the tie bolt, they are maintained in true register with one another and cannot slip or get out of alinement.

Features of the invention, other than those adverted to, will be apparent from the hereinafter detailed description and appended claims when read in conjunction with the accompanying drawing.

The accompanying drawing illustrates one practical embodiment of the invention, but the construction therein shown is to be understood as illustrative only, and not as defining the limits of the invention.

Figure 1 is a perspective view of a scraper embodying the present invention.

Figure 2 is a transverse plane section on the line 2—2 of Figure 1.

Figure 3 is a longitudinal section on the line 3—3 of Figure 2.

Figure 4 shows various parts of the scraper dismantled to better illustrate their individual structures.

Any suitable duplex cutter may be used with the scraper of this invention, but I find it economical and efficient to form the duplex cutter of two channeled sections 12, the flanges 13 of which are sharpened and honed to cutting edges. Each channeled cutter is provided in its base with a pin 14 and a perforation 15 similarly located so that two of these channel sections may be placed together base to base to form the duplex cutter of I-beam cross section with sharp edged flanges along the sides of its web.

The body of the scraper is formed from two stamped sheet metal sections 1 and 2, each of which is provided along its two longitudinal edges with a wall 3 and a similar wall is formed along its rear edge, these walls 3 being of uniform depth throughout. The forward end of each section has an inclined wall 4 merging into a clamping jaw 5. When the two sections are positioned with their peripheral walls in face abutting relation, a hollow body housing is formed, provided at its forward end with parallel spaced apart clamping flanges 5.

To one of these sections a handle 6 may be secured by screw 7 and the sections are secured in assembled relation by means of a threaded post or bolt 8. This bolt extends downwardly through a knob 9, through a hole 10 in the section 1 and threads into a tapped boss 11 in section 2, as shown best in Figure 3. The bolt 8 thus serves to clamp the sections together and also mount the knob 9 on the body. In the preferred form of tool, both the handle and the knob are employed, although either or both may be omitted without departing from the invention. In the event that the knob is omitted, a shorter bolt 8 is used with its head bearing directly upon the upper surface of the section 1.

It will be noted that the distance between the flanges 13 of the scraper at the forward end of the body and the combined widths of the jaws 5 and inclined portions 4, are substantially equal, so that, when a duplex cutter is positioned as here shown, this cutter will automatically longitudinally register the sections. Moreover, since the lengths of the cutter is equal to the interior width of the housing, the flanges 13 within the housing will laterally register the sections, so that flanges 3 at the forward portion of the scraper will be maintained in registering edge abutting relation. A spare duplex cutter is adapted to be positioned transversely within the housing, as shown in Figure 3, and the presence of this cutter assures registration of the rear portions of the housing sections. So long as the bolt 8 clamps the sections firmly together as shown in this figure, all parts of the scraper will be maintained rigid with respect to one another and the scraper may be used in the performance of its usual functions.

When the exposed cutting edges of the forward duplex cutter become dulled, the bolt 8 may be withdrawn and this cutter reversed, so as to expose the other two cutting edges of such cutter for use. When all four cutting edges of the forward cutter become dull through use, the bolt is again withdrawn, the housing opened and the spare cutter and the dulled cutter are substituted for one another.

The tool of this invention is well adapted for quantity production. It may be made economically, does not require close tolerances and can be sold at an attractive retail price. Nevertheless the scraper is a good tool, thoroughly reliable and it works well in practice. The blades may be readily changed without any danger of cutting the hands of the operator.

The foregoing detailed description sets forth the invention in its preferred practical form, but the invention is to be understood as fully commensurate with the appended claims.

Having thus fully described the invention, what I claim as new and desire to secure by Letters Patent is:

1. A wood scraper comprising a pair of like duplex cutters each of which is of I-beam cross section comprising a web and two sharp edged flanges at the opposite sides of said web, a pair of sheet metal sections having, along their lateral edges and across their rear ends, marginal walls arranged in edge abutting relation to form a hollow scraper body the interior width of which is substantially equal to the length of each duplex cutter, one of said duplex cutters being positioned transversely within the rear portion of the body to maintain the edges of its lateral walls in abutting relation, the forward ends of the sections being provided with inclined converging walls terminating in spaced apart jaws clamping between them the web of the second duplex cutter with two of the cutting flanges of the latter cutter externally of the scraper body and in engagement with the forward ends of said jaws and having its other two cutting flanges internally of the scraper body and engaging said inclined converging walls to maintain the sections of the body against relative longitudinal movement, and means for detachably holding the two sections of scraper body in assembled relation.

2. Wood scraper according to claim 1, wherein the interior height of said scraper body is substantially equal to the combined height of said flanges.

3. Wood scraper according to claim 1, wherein the two sections are detachably held in assembled relation by a tie bolt.

4. A wood scraper comprising: a pair of sheet metal sections having, along their lateral edges and across their rear ends, marginal walls arranged in edge abutting relation to form a hollow body, the forward ends of the sections being provided with inclined converging walls terminating in parallel spaced apart clamping jaws, a cutter of I-beam cross section having a web and two sharp edged cutting flanges at each of the opposite sides of said web, said cutter being positioned with said web between said jaws with two of said cutting flanges within the interior of the hollow body and the other two of said cutting flanges externally of the hollow body and with the forward ends of the jaws abutting the external cutting flanges and the interior cutting flanges engaging the inclined converging walls of said sections.

SAUL SHALER.

References Cited in the file of this patent

UNITED STATES PATENTS

| Number | Name | Date |
|---|---|---|
| 1,903,877 | Potter | Apr. 18, 1933 |
| 1,943,252 | Abrahamsen | Jan. 9, 1934 |
| 1,994,417 | Lee | Mar. 12, 1935 |
| 2,042,273 | Okun | May 26, 1936 |
| 2,306,083 | Rioux | Dec. 22, 1942 |